March 16, 1965  J. W. BROWN  3,173,190
APPARATUS FOR PLACING AND TRIMMING PACKING INSERTS AND THE LIKE
Filed May 29, 1962  3 Sheets-Sheet 1

INVENTOR.
JOSEPH W. BROWN
BY
*Philip D. Gabrick*
ATTORNEY

INVENTOR.
JOSEPH W. BROWN
ATTORNEY

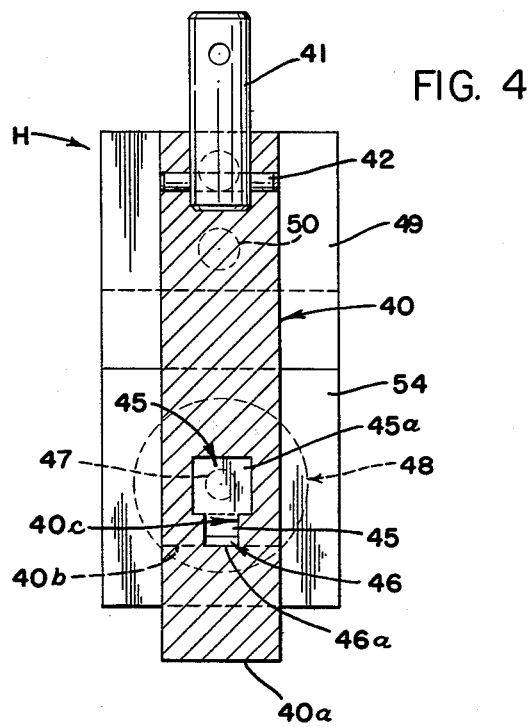
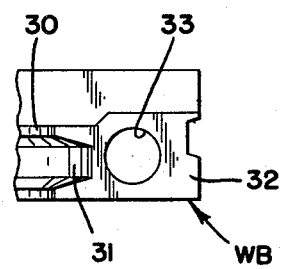
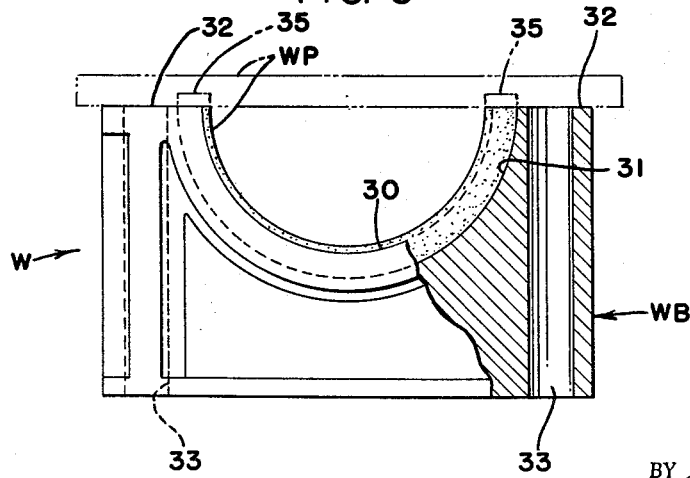

United States Patent Office 3,173,190
Patented Mar. 16, 1965

3,173,190
APPARATUS FOR PLACING AND TRIMMING
PACKING INSERTS AND THE LIKE
Joseph W. Brown, Euclid, Ohio, assignor to Pressure
Castings, Inc., Euclid, Ohio, a corporation of Ohio
Filed May 29, 1962, Ser. No. 198,573
7 Claims. (Cl. 29—33)

The present invention relates generally to an apparatus for inserting a flexible element into a suitable seat formed in a more or less rigid member; and more particularly to a method and apparatus for inserting packing into an arcuate seat in a sealing block.

In many mechanical environments, for example in automotive engines, a rotating shaft is provided with a seal formed by two generally similar sealing blocks each having a semi-cylindrical recess grooved over its semi-circumference to receive a strip of packing or sealing material seated therein but slightly projecting radially therefrom so that when the blocks are secured to each other in opposed relation about the shaft, the sealing material forms a circumferential shaft seal. The sealing material for such a purpose is commonly woven from thick threads of fibrous material into heavy cord-like form and impregnated with solid or viscous lubricants.

By present practice, a sealing material strip of excess length is seated in the groove of the semi-cylindrical surface with excess sealing material projecting from opposite ends of the groove, and the excess at each end is cut away by hand with a knife guided on a surrounding flat surface of the block lying substantially in a plane diametric to the semi-cylindrical surface in the usual block. To obtain an optimum seal, it is necessary that the excess packing material be cut flush at a plane coincident with such surrounding surface of the block, representing an operation which has not as yet been carried out in a practical manner by any acceptable known apparatus.

By the present invention as hereinafter disclosed there is afforded an apparatus for properly seating a packing strip in a seal block as a semi-circular seal element of desired form, the element being of excess length, and thereafter cutting off the excess at the required location, all in a relatively rapid and precise manner. For this purpose, the specifically described apparatus includes a reciprocable working head movable by a pressurized fluid actuated cylinder in a press-like arrangement toward and away from a sealing block on which is positioned a relatively straight strip of the packing material of excess length; the block having a semi-cylindrical portion adapted to carry the strip into a grooved seat therefor on the block, suitably seat and form the sealing material, and then cut off simultaneously two projecting ends of the material at the exact location and plane required.

It is the general object of the present invention to provide an apparatus for properly seating a packing strip in a seal block groove while shaping the same to desired form and thereafter to cut off the sealing material precisely flush with adjacent areas of the seal block structure. Another object of the present invention is to provide apparatus for properly inserting, forming and trimming the sealing material for a seal block which obviates manual cutting of the sealing material by an operator. A still further object of the present invention is the provision of an apparatus for seating and forming a strip of packing material into a seal block and thereafter trimming the sealing material flush with the ends of the block, all in a quite rapid and precise manner relatively effortless for the operator and at lower cost in comparison with prior practice.

Other objects and advantages will appear from the following description and drawings wherein:

FIG. 4 is a vertical section through the working head taken as indicated by the line 4—4 in FIG. 2;

FIG. 5 is a detail view of a seal block and seal packing shown as an example of workpiece elements operated on by the apparatus; and FIG. 6 is a fragmentary detail view of the block of FIG. 5.

One manner of carrying out the invention is illustrated by FIGS. 1, 2, 3 and 4 of the drawings showing a machine adapted to carry out the insertion and trimming of a semi-circular sealing packing element WP in a groove formed in a semi-cylindrical recess of a seal block WB appearing in FIGS. 5 and 6 as the elements of the work designated W presented to the machine.

Figure 1:
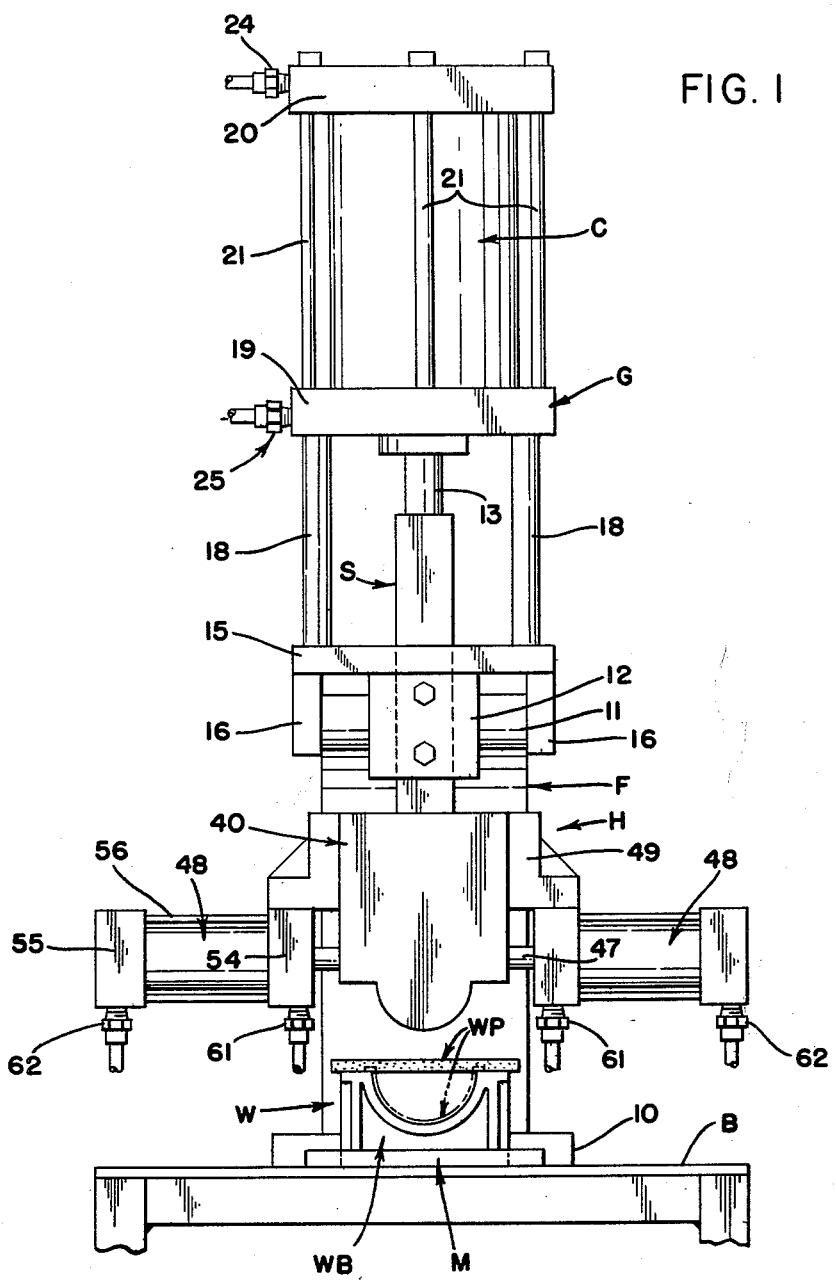
FIG. 1 is a front elevational view showing the general arrangement of an apparatus embodying the present invention.

As shown in FIG. 1, the principal components of the apparatus are a sturdy bench or table B serving as a base; a roughly C-shaped casting providing a primary frame or pedestal F, having a foot portion 10 secured on a base B and a top portion 11 overhanging working space therebelow; a working head H secured on the lower end of a vertical slide member S reciprocable in a slide block 12 mounted on the frame top 11; a pneumatic cylinder C with piston rod arranged in vertical alignment with the slide member S and having its piston member 13 secured to the upper end of the slide member; an auxiliary frame structure G for rigidly supporting the cylinder unit on the primary frame F; and means M for locating and clamping the work W relative to the base B in proper position for operations thereon by the head H.

Before considering further details of the apparatus, it is noted that the work W upon which the machine operates is here shown as comprised of the seal block WB having a substantially semi-cylindrical recess 30 grooved at 31 to receive a major portion of the thickness of a suitable packing element WP, the groove 31 shown as having side walls inwardly convergent to a flat groove bottom surface. Two such blocks generally of identical form with inserted packing are intended to be brought into opposed relation, with the coplanar surfaces 32 in respectively abutting relation and secured by suitable bolts passed through aligned apertures or bores 33, to provide a circumferential circular or cylindrical seal about a rotating shaft. Hence it is highly important that the the packing member WP be inserted evenly to fill the full depth of the groove 31 with a substantially equal radial thickness throughout the resulting circle of packing not received by the groove; and also that thereafter in each block the ends of the packing element be flush with the adjacent surrounding end surfaces 32. This is accomplished in the disclosed apparatus by the head H which suitably seats a packing element of excess length in the groove with ends 35 (see FIG. 5) projecting above a respective adjacent surface and thereafter cuts off the projecting ends by respective knife blades sliding with cutting edges in the plane of surfaces 32.

In the frame G, a horizontal plate member 15, secured on the top portion 11 through depending members 16 embracing opposite sides of the head 11, has rigidly secured thereto four spaced vertical post members 18 on the top of which is secured a plate 19 supporting the lower end of the cylinder unit C and to which in turn in spaced parallel relation a flat horizontal plate member 20 is secured through tie bolts 21 to provide a reaction surface for the upper end of the cylinder C.

The cylinder C is preferably a double-acting piston cylinder unit to the opposite ends of which pressurized operating fluid is supplied as required from a controlled supply source (not shown) through conduits 24 and 25 at the upper and lower cylinder ends respectively. The slide member S and the slide receiving aperture in the cooperating slide block or slideway member 12 preferably have some non-circular cross section, being for example rectangular, with an appropriate non-rotatable connection between the slide and head H to guide the head in vertical reciprocation without any twisting.

In the operating head H, of generally symmetrical structure about a vertical centerline or plane (see FIG. 2), a rectangular body element or block 40 is secured on the lower end of the slide S by any suitable means, such as a coupling pin or stud 41 with opposite ends received respectively in blind holes in the top of the block and lower end of the slide S and secured for example by a pin such as 42 driven into aligned apertures of the coupling pin and block or slide respectively. The lower end of the body is provided with a semi-cylindrical extension or projection 40a, preferably integral, having a radius smaller than and differing from the radius of the semi-circular recess 30 of the intended work by substantially the amount of the desired radial projection of the packing WP inserted in groove 30; and at opposite sides of the projection 40a, is further provided with coplanar end surfaces 40b lying in a diametral plane of and at the base of the projection 40a.

The thickness of the portion 40a preferably is somewhat greater than the width of the groove 30 and the packing to be inserted therein to provide a semi-cylindrical surface beyond the ends of which the packing WP will not escape under insertion pressures forming the shaft-engaging surface thereof.

Figure 2:
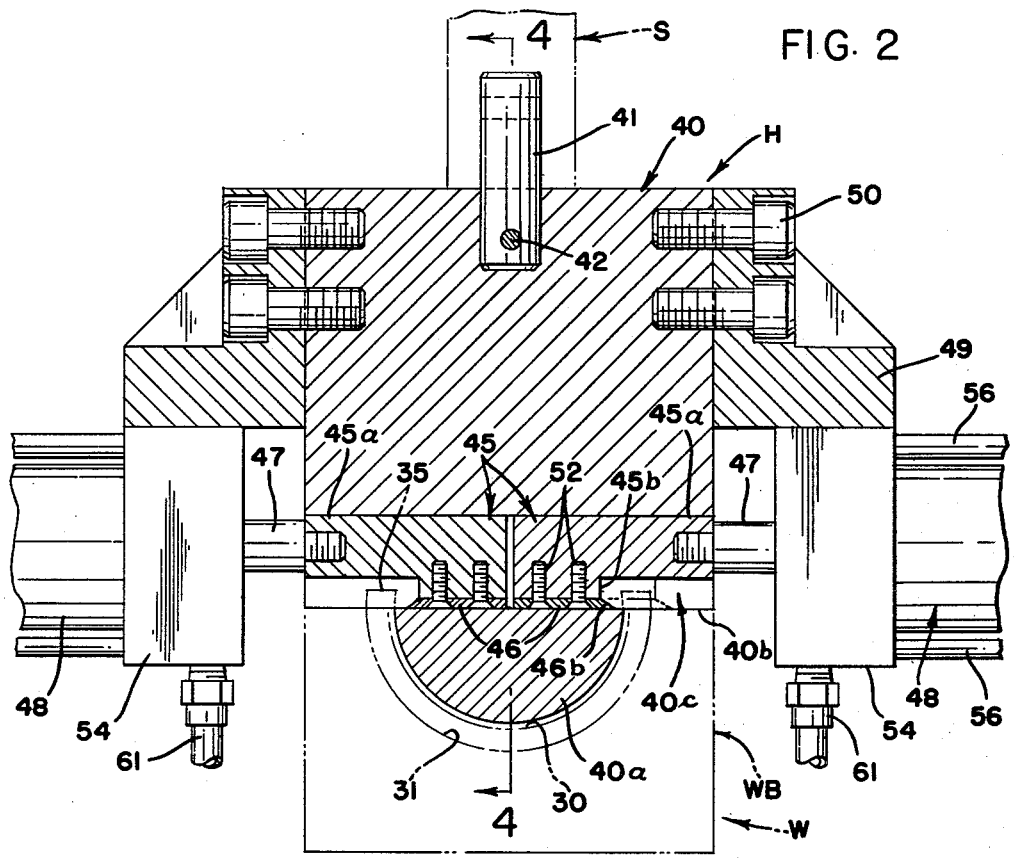
FIG. 2 is a detail view of a working head of the apparatus partly in vertical section and with certain portions broken away.
Figure 3:
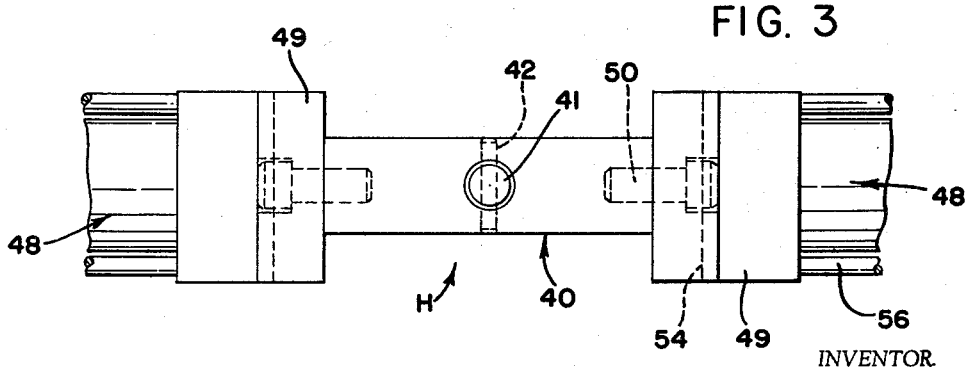
FIG. 3 is a partial plan detail view corresponding to FIG. 2.

As may be better seen from FIG. 4 taken in conjunction with FIG. 2, a slideway 40c for identical knife carriers 45 actuated by cylinders 48 is cut through the block 40 parallel to the surfaces 40b and therefore to the base diametral plane of the projection 40a. The slideway is somewhat T-shaped in form having an upper portion square in cross-section and a lower portion of smaller width opening through the face of surfaces 40b; and in the region of the projection 40a has a bottom wall or surface coplanar with surfaces 40b.

The knife carrying slide blocks 45 have main body portions 45a complementary in cross section to and slidable in the square portion of the slideway 40c, and near their inner ends downward projections 45b to which the knife blades 46 are secured, removably for replacement or sharpening, by flat head screws 52. The joint cross section of the projections 45b and knives 46 is generally complementary to the lower portion of the slideway 40c into which they are received. Hence, abutment of the surfaces 40b on the surfaces 32 of a block assures an exact positioning and guiding of the knife edges relative to the surfaces 32; for as will be noted, the cutting edge 46a of a knife 46 is formed between an upper level and a straight bottom blade face, and therefore the actual cutting edge is movable substantially in the plane of the surfaces 40b.

Outward beyond the knife supporting projection there is provided clearance for a projecting end of the packing, as at 35 in FIG. 5, and also between the carrier block and the projecting cutting edge portion of the knife. As appears in FIG. 2, the length of the knife blade and the innermost positioning of the knife carrier blocks 45 is such that the cutting edge of the knife is completely retracted within the limits of the diameter 40a.

For knife reciprocation, the blocks 45 are threaded on aligned piston rods 47 of the piston-cylinder units 48 secured on opposite sides of block 40 through mounting means including L-shaped mounting blocks 49 attached to opposite side faces of block 40 by cap screws 50.

For each cylinder unit 48, additional structure is included somewhat similar to that for the main press power cylinder C, including a member 54 affixed to or integral with the L-shaped member 49, providing a seat for one end of the cylinder and apertured for the piston rod 47 projecting therethrough, and a second member 55 secured in spaced relation to 54 by tie bolts 56, so that the cylinder is embraced endwise between the members 54 and 55.

The cylinder units 48 may be double-acting as here shown with pressurized fluid selectively applied to opposite ends through conduits 61, 62 for drawing the knives outwardly in a cutting stroke and returning them to endwise or retracted position respectively, or the units may be single-acting to be moved in the cutting stroke by fluid pressure but spring-returned upon release of the cutting pressure.

The means M for properly locating a block WB relative to the path of the head 40 as each block is manually or otherwise placed in position, although here shown in generalized form, may be any suitable means known to the art providing at least surfaces for locating a front or back face of the block and one end of the block; and further, if desired or convenient, for clamping the block WB in the required position either by fluid pressure cylinders or mechanical means as well known for such purpose.

In carrying out the work assembly, the block is properly positioned, and a straight piece of the packing of suitable length is laid across the top of the block on the surfaces 32 as indicated in FIG. 5, and positioned in alignment with the open ends of the groove 31. Then through suitable controls pressure is applied at 24 to cylinder C to move the head downwardly, the projection 46 encountering and carrying the packing strip downwardly and forming it radially into the groove 31, until the flat surfaces 40b at the bottom of the head block 40 engage the top surfaces 32 of the workpiece block, thereby bringing the plane of knife edge lateral movement substantially to the plane of surfaces 32. Fluid pressure is then applied to the cylinders 48 simultaneously to move the blades outwardly away from each other thereby severing the projecting ends 35 of the packing perfectly flush with the surfaces 32. Thereupon the cutting pressure is released, and the knives thereafter returned either by spring action in the case of a spring-returned type unit, or by return fluid pressure applied at conduit 62; whereupon the head may be retracted or raised upon release of pressure at 24 by work head returning pressure at 25. With appropriate regulation of air pressure supplied to cylinder C, the end surfaces 32 of the block WB itself may provide suitable stop means for the working head determining the final position of arcuate projection 40a relative to the packing seat groove.

Since various types of pneumatic or hydraulic fluid pressure supply systems and operating controls may be used as well known in the art, and these would vary with the particular conveniences of operation desired, and types of cylinder units, and would depend in part on whether the machine is manually fed and operator actuated for each step of the method, or automatically fed and operated, and further the details of such control are not per se part of the invention, these are here no further related. However, a pneumatic system is generally preferred because of simplicity and generally lower initial and maintenance costs.

I claim:

1. Apparatus for inserting an element of elongated flexible material in a circumferentially extending seat groove in a concave recess formed in an edge of a relatively rigid member, said groove having opposite ends terminating at flat surfaces on said edge, and the element ends being flush with the flat surfaces, said apparatus comprising: a work supporting base; pressiurized-fluid powered cylinder means including a member reciprocable toward and away from said base; a work head on the reciprocable member, said head including a projection distal from the reciprocable member shaped to provide a convex surface which may be brought within the recess into parallelism with the concave recess surface, said projection having a base at which terminate opposite ends of said convex surface, slideway means formed in the head at the base of the projection, knife carrier slides reciprocable in the slideway means to retract respective blades thereon within the head and extend the same beyond the projection base, and powered actuating means on the head for reciprocating said slides; positioning means to support said rigid member rigidly on the work-supporting base with an excess length of said material supported on said edge in the plane of said groove and with the recess aligned with the projection of said head; stop means on the head for stopping advance of the head with the paths of blade reciprocation substantially coplanar with respective flat surfaces on the rigid member; and operator controlled means for supplying fluid pressure to said cylinder for advancing the projection into said recess to seat said length in said groove and for energizing said actuating means to move the blades outwardly in a cutting stroke trimming excess flexible material flush with said flat surfaces.

2. Apparatus as described in claim 1, including: said head having, as said stop means, flat surfaces extending laterally from the base of said projection and positioned to abut said flat surfaces of a said rigid member supported by said positioning means.

3. Apparatus for inserting a sealing element of elongated flexible packing material in a seal block having a semi-cylindrical recess formed in a block edge and a circumferentially extending seat groove in the recess, said groove having opposite ends terminating at flat edge surfaces on opposite sides of and substantially coplanar with a plane diametric to said recess, and the element ends being flush with the flat surfaces, said apparatus comprising: a work-supporting base; pressurized-fluid powered cylinder means including a member reciprocable toward and away from said base; a work head on the reciprocable member, said head including a semi-cylindrical projection distal from the reciprocable member shaped to provide a convex surface disposable within the recess in parallelism with the recess semi-cylindrical surface, slideway means formed in the head at and parallel to a diametric base of the projection, knife carrier slides reciprocable in the slideway means to retract respective blades thereon within the head and extend the same beyond the diametric base; and powered actuating means on the head for reciprocating said slides; positioning means to support said block rigidly on the work supporting base with an excess length of said material supported against said flat surfaces in the plane of said groove, and with the recess aligned with the head projection; stop means on the head for stopping advance of the head with the paths of blade reciprocation substantially coplanar with respective flat surfaces on the rigid member; and operator controlled means for supplying fluid pressure to said cylinder for advancing the projection into said recess to seat said length in said groove and for energizing said actuating means to move the blades outwardly in a cutting stroke trimming excess flexible material flush with said flat surfaces.

4. Apparatus as described in claim 3, including: said head having, as said stop means, flat surfaces extending laterally from said projection in the diametrical plane of the base of said projection to abut said flat surfaces of a said block supported by said positioning means.

5. Apparatus for inserting a sealing element of elongated flexible packing material in a seal block having a semi-cylindrical recess formed in a block edge and a circumferentially extending seat groove in the recess surface, said groove having opposite ends terminating at coplanar flat edge surfaces extending diametrically to and on opposite sides of said recess, and the element ends being flush with the flat surfaces, said apparatus comprising: a work-supporting base; a pressurized-fluid powered double-acting cylinder unit including a piston rod reciprocable toward and away from said base; a work head moved by said piston rod, said head including a convex semi-cylindrical projection distal from the rod shaped to be disposable within the recess in parallelism with the recess semi-cylindrical surface, slideway means formed in the head at and parallel to a diametric base of the projection, knife carrier slides reciprocable in the slideway means to retract respective blades thereon within the head and extend the same beyond said diametric base; and fluid powered actuating cylinder means on the head for reciprocating said slides; positioning means to support said block rigidly on the work-supporting base with an excess length of said material supported against said flat surfaces in the plane of said groove, and with the recess aligned with the head projection; stop means on the head for stopping advance of the head with the paths of blade reciprocation substantially coplanar with respective flat surfaces on the said block, and operator controller means for supplying fluid pressure to said cylinder for advancing the projection into said recess to seat said length in said groove and for energizing said actuating means to move the blades outwardly in a cutting stroke trimming excess flexible material flush with said flat surfaces.

6. Apparatus as described in claim 5, including: said head having, as said stop means, flat surfaces extending laterally from the base of said projection and positioned to abut said flat surfaces of said block supported by said positioning means.

7. Apparatus as described in claim 5, including a slideway formation supported by said base and a slide non-rotatably mounted therein and connected at one end to and in alignment with said piston rod and at the other end to said work head.

References Cited by the Examiner
UNITED STATES PATENTS

| | | | |
|---|---|---|---|
| 1,629,427 | 5/27 | Whitworth | 29—445 |
| 1,677,432 | 7/28 | Croning | 29—445 |
| 2,230,189 | 1/41 | Ferngren. | |
| 2,270,187 | 1/42 | Dulmage. | |

WHITMORE A. WILTZ, *Primary Examiner.*